United States Patent [19]

Kervinen et al.

[11] Patent Number: 5,418,823
[45] Date of Patent: May 23, 1995

[54] COMBINED ULTRASONIC AND EDDY-CURRENT METHOD AND APPARATUS FOR NON-DESTRUCTIVE TESTING OF TUBULAR OBJECTS TO DETERMINE THICKNESS OF METALLIC LININGS OR COATINGS

[75] Inventors: John A. Kervinen, Palo Alto; Kurt D. Ellis, Wilmington, both of Calif.

[73] Assignee: General Electric Company, San Jose, Calif.

[21] Appl. No.: 177,023

[22] Filed: Jan. 4, 1994

[51] Int. Cl.⁶ ............................................. G21C 17/00
[52] U.S. Cl. ...................... 376/245; 376/258; 73/622
[58] Field of Search ............... 376/245, 457, 252, 249, 376/255, 258; 73/622

[56] References Cited

U.S. PATENT DOCUMENTS

| | | | |
|---|---|---|---|
| 3,823,068 | 7/1974 | Worlton et al. | 376/450 |
| 3,967,382 | 7/1976 | Johnson et al. | 3.3/125 R |
| 4,402,904 | 9/1983 | Anthony | 376/251 |
| 4,555,664 | 11/1985 | David et al. | 324/225 |
| 4,625,165 | 11/1986 | Rothstein | 324/220 |
| 4,663,112 | 5/1987 | Gradel et al. | 376/245 |
| 4,673,877 | 6/1987 | Sakamoto et al. | 324/225 |
| 4,741,878 | 5/1988 | Gebelin et al. | 376/248 |
| 4,803,428 | 2/1989 | Crostack | 324/230 |
| 4,855,677 | 8/1989 | Clark, Jr. et al. | 324/238 |
| 4,856,337 | 8/1989 | Metala et al. | 73/601 |
| 4,918,989 | 4/1990 | Desruelles et al. | 73/627 |
| 4,924,182 | 5/1990 | Vernon et al. | 324/237 |
| 4,955,235 | 9/1990 | Metala et al. | 73/601 |
| 4,978,917 | 12/1990 | Goldenfield et al. | 324/226 |
| 5,015,950 | 5/1991 | Rose et al. | 324/224 |
| 5,063,780 | 11/1991 | Landry et al. | 73/622 |
| 5,066,452 | 11/1991 | Hancock et al. | 376/252 |
| 5,068,608 | 11/1991 | Clark, Jr. | 324/220 |
| 5,156,636 | 10/1992 | Klucjis | 73/597 |
| 5,178,014 | 1/1993 | John, Jr. et al. | 73/622 |

OTHER PUBLICATIONS

"Liner Thickness Measurement for Zirconium Lined Zircaloy Cladding Tube Using Dual Frequency Eddy Current Method", Iwasaki et al.

*Primary Examiner*—Daniel D. Wasil
*Assistant Examiner*—Meena Chelliah
*Attorney, Agent, or Firm*—J. E. McGinness

[57] ABSTRACT

A combined ultrasonic and eddy-current method and apparatus for non-destructively determining the liner thickness of a zirconium liner provided at the inner surface of a zirconium alloy nuclear fuel rod tube utilizes dimensional data acquired via conventional ultrasonic measurement techniques and impedance data acquired through electromagnetic techniques to calculate liner thickness in accordance with a specific formula. The apparatus utilizes a computer or programmable arithmetic unit with associated memory and I/O devices connected to electromagnetic and ultrasonic measurement subsystems. A particular eddy-current probe arrangement consisting of a differential coil pair is employed to obtain impedance measurements from the outside of the cladding tube. Calibrated reference impedance values for various different inner and outer tube diameters having a constant liner thickness are measured and retained in a memory. Calibrated reference impedance values for tubes of various liner thicknesses with the same inside and outside diameter dimensions are also measured and stored. A specimen cladding tube is tested and an inside diameter is computed using conventional electromagnetic techniques. The specimen tube inside diameter is also measured ultrasonically and a specific calculation of liner thickness is performed based on the difference between the inside diameter as determined by ultrasonic technique and the inside diameter as measured by eddy-current technique. The specific method of calculation utilized corrects for the erroneous effect that variations in cladding tube liner thickness can have on dimensions computed via conventional electromagnetic eddy-current techniques alone.

16 Claims, 4 Drawing Sheets

CONNECTED TO IMPEDANCE BRIDGE

COMBINED ULTRASONIC AND EDDY-CURRENT METHOD AND APPARATUS FOR NON-DESTRUCTIVE TESTING OF TUBULAR OBJECTS TO DETERMINE THICKNESS OF METALLIC LININGS OR COATINGS

FIELD OF THE INVENTION

This invention relates generally to a method and apparatus for non-destructively measuring the thickness of a bonded metallic lining (or coating) on the interior surface of thin-walled tubular objects. In particular, the invention relates to a combined ultrasonic and eddy-current non-destructive testing system for measuring the thickness of bonded metallic linings applied to nuclear fuel rod cladding-tubes. More particularly, the invention is directed toward a non-destructive method and apparatus for determining the thickness of a zirconium barrier lining provided at the inner surface of a zirconium alloy nuclear fuel rod cladding tube.

BACKGROUND AND SUMMARY OF THE INVENTION

In various environments, the dimensional and structural integrity of certain critical components of a particular system or apparatus is of the utmost importance in assuring against future failures. One example of such a critical component is the "cladding" tube of a nuclear fuel rod. Conventionally, a column of nuclear fuel pellets are sealed into a metal cladding tube, which is assembled along with other fuel containing cladding tubes in a lattice structure constituting the fuel rod assembly of a nuclear reactor. The purpose of "cladding" the nuclear fuel is to prevent chemical reactions between the nuclear fuel and the coolant or moderator, and also to prevent partially gaseous radioactive fission products from leaking into the coolant or moderator from the fuel. Moreover, in order to withstand various structural stresses experienced during their service life as nuclear fuel rods, cladding tubes must be manufactured to exacting standards of dimensional and structural integrity. Accordingly, cladding tube wall thickness is an important dimensional criteria since a thin wall section, which is less than a minimum tolerance dimension, may seriously jeopardize the ability of the fuel rod to withstand stresses imposed by differences in thermal expansion between the cladding and the contained fuel pellets. Likewise, inner and outer tube diameters must be precisely controlled such that fuel pellets can be properly loaded within the tube and so that the tubes can be properly assembled into fuel rod bundles.

The structural and compositional integrity of cladding tubes is also very important. Conventionally, a zirconium alloy (e.g., Zircaloy-2 or -4) is used as a preferred material in the construction of cladding tubes as it is well known for its neutron absorption characteristics, corrosion resistance, and chemical stability at elevated steady state temperatures. Moreover, in order to further reduce the possibility of incurring internal tube wall stress corrosion and/or cracking due to localized thermal expansion differences between the nuclear fuel and the cladding tube, a liner of substantially pure zirconium is conventionally bonded to the inner surface of a cladding tube. A pure zirconium liner is utilized because of its superior ability to moderate localized stress/strains occurring along the inner surface of a cladding tube during abrupt temperature changes. It is critically important that the zirconium liner be of a uniform predetermined thickness (typically on the order of 80–100 microns in thickness) to be effective.

Concerning the critical nature of nuclear fuel rod cladding tubes, it is essential to carefully and accurately inspect each cladding tube over its entire length for both dimensional and structural integrity before it can be utilized as a nuclear fuel rod. Prior to the present invention, the thickness of a cladding tube inner lining (also called a "barrier" layer) was determined by destructive metallography of representative samples. However, for obvious practical and economic reasons, it is highly desirable to ascertain compliance of the liner thickness with design specifications using non-destructive testing methods.

As can be appreciated by those skilled in the art, ultrasonic inspection methods utilizing a transducer in a pulse-echo mode are commonly known to provide non-destructive dimensional measurements of critical components for quality assurance. A transducer is scanned over the component, either by motion of the transducer and/or the component while the transducer is periodically electrically excited to admit a probing ultrasonic energy pulse. In the intervals between pulses, the transducer receives echoes which may be analyzed for dimensional information. Unfortunately, when used to inspect cladding tube structure, ultrasonic wave analysis cannot accurately distinguish liner or barrier layer boundary echoes from cladding tube inner surface echoes (presumably due to the similarity of the materials involved and the extreme thinness of the lining).

Non-destructive electromagnetic profilometry techniques are also well known in the art. Some exemplary eddy-current impedance measurement systems of the type are discussed in U.S. Pat. No. 4,741,878, U.S. Pat. No. 4,673,877 and U.S. Pat. No. 3,967,382. However, conventional electromagnetic testing systems that are used to detect various defects and changes in tube wall thickness are known to employ electro-mechanical probes that are inserted into the cladding tubes and generate eddy-currents. These conventional eddy-current probe systems utilize scanning arrangements that require maintaining the probe element in constant sliding contact with the inner surface of the tube throughout the duration of the test. Such an arrangement inevitably increases the chances of scratching or marring the cladding liner during the testing procedure and, thus, damaging the tube in the process. Moreover, eddy-current probe arrangements of this type are typically mechanically complex, costly to manufacture, difficult to use, and susceptible to inherent inaccuracies caused by "lift-off" variations (i.e., varying gaps or distances between the surface of the eddy-current probe measuring coils and the inner surface of the tube).

In accordance with an exemplary embodiment of the present invention, an improved method and apparatus is provided for determining the average circumferential thickness of a zirconium liner or "barrier" layer provided on the inside surface of a nuclear fuel rod cladding tube. In particular, the present invention utilizes conventional ultrasonic measurement techniques and conventional electromagnetic eddy-current analysis techniques in a combined system arrangement that involves a specific method for computing liner thickness which overcomes the aforementioned problems associated with prior art approaches. Briefly, a particular eddy-current probe arrangement consisting of a differential coil pair is employed to obtain impedance measurements from the outside of the cladding tube. Calibrated reference impedance values for different inner and outer cladding tube diameters with the same liner thickness are measured from a calibration standard and retained in a memory. Calibrated reference impedance values for various liner thicknesses with the same inside and outside diameter are also measured and stored. A specimen cladding tube is then tested and an inside diameter is computed using conventional electromagnetic techniques. The specimen tube inside diameter is then measured ultrasonically and a specific calculation of liner thickness is performed based on the difference between the inside diameter as determined by the ultrasonic technique and the inside diameter as measured by the eddy-current technique. A specific computation is then performed which corrects for the erroneous effect that variations in cladding tube liner thickness can have on dimensions computed via conventional electromagnetic eddy-current techniques alone.

Eddy-current impedance measurements of a fuel rod cladding tube, however, are greatly effected by the respective compositions of the cladding tube and liner (e.g., the overall conductance of an induced eddy-current is dependent on the relative proportions of Zircaloy-2 and zirconium in the cladding). Consequently, the tube under test must necessarily have the same liner thickness (or relative proportions of respective metals) as whatever standard is used to initially calibrate the eddy-current measurement apparatus otherwise the measured conductances will not accurately reflect actual inner and outer diameter dimensions. Since this is obviously not feasible, inside diameter measurements as determined by eddy-current electromagnetic techniques may not correspond exactly to the actual inside diameter. Consequently, in accordance with a preferred embodiment of the present invention, cladding tube inside diameter is determined by conventional ultrasonic techniques as well as electromagnetic techniques. The difference between the "actual" inside diameter as determined by ultrasonic techniques and the inside diameter as measured by the above eddy-current technique is then used to accurately calculate the actual thickness of a cladding tube liner by a computational method discussed herein in greater detail below.

Although the present invention was developed as a result of a need for improved techniques to accurately measure the interior liner thickness of nuclear fuel rod cladding tubes, it would be appreciated by those skilled in the art that the invention has other uses, such as, for example, determining the thickness of metallic linings or coatings on other tubular members or other types of conduits.

DETAILED DESCRIPTION OF THE DRAWINGS

Figure 1:
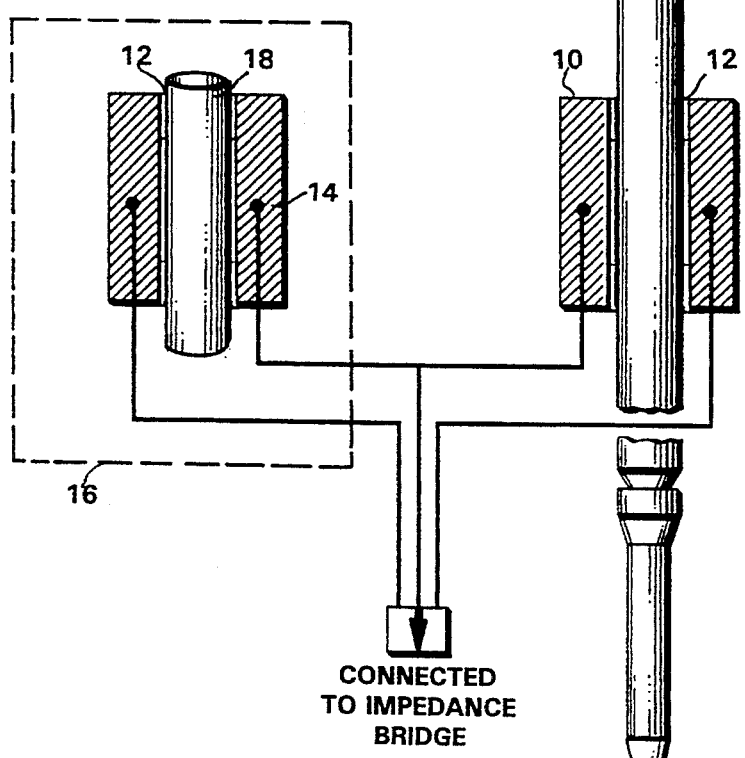
FIG. 1 is a cross-sectional schematic diagram of an exemplary embodiment of the differential coil pair arrangement for the electromagnetic measurement subsystem.

In accordance with an exemplary embodiment of the present invention, the eddy-current probe arrangement and technique used to obtain impedance measurements from the outside of a cladding tube employs a pair of wire coil windings electrically interconnected to form a differential coil pair, as illustrated in FIG. 1. The differential coil pair are electrically interconnected into a impedance bridge and oscillator circuit arrangement that forms conventional electronic impedance measuring equipment (not shown). One of the coils (10) is used as the eddy-current generating "probe" in the testing of cladding tubes by passing the specimen cladding tube (11) undergoing test through the central opening (12) in the coil windings. The remaining coil (14) is contained in a separate magnetically shielded housing (indicated by dotted line 16) and surrounds a short exemplary segment (18) of a fuel rod cladding tube that is used as a "dummy" impedance load.

Coils 10 and 14 are preferably constructed such that the diameter of central opening 12 is on the order of a few mils larger than the outside diameter of the nominal type of tube anticipated being tested. It is desired to match probe coil inner diameter as closely as possible with cladding tube outer diameter to minimize any "fill" errors (analogous to "lift-off" errors in conventional eddy-current surface probes) in the measured impedance. Accordingly, different specimen tube types may require a correspondingly different coil-pair size.

Dummy impedance load tube segment 18 is maintained within the coil throughout the testing process and functions primarily as a nominal load impedance necessary to maintain the impedance bridge circuit (not shown) in a near-balanced condition. Accordingly, a dummy load segment is chosen which has dimensional and physical properties (e.g., electrical conductivity and magnetic permeability) that are substantially similar to the particular type of fuel cladding tube to be tested.

Since the two coils are connected in a bridge circuit arrangement, any difference in electrical impedance between the two coils creates a measurable impedance imbalance which is indicative of a difference in the respective physical properties (e.g., a dimensional or compositional difference) of the dummy load cladding segment and the specimen cladding tube under test. Ideally, if the dummy load cladding tube segment is compositionally identical to the type of specimen fuel rod cladding tube undergoing a test, any impedance imbalance measured in the bridge circuit coils is caused predominately by dimensional differences between the dummy impedance load tube segment and the fuel rod cladding tube. To quantify the above dimensional difference, a carefully constructed "calibration standard" cladding tube is utilized to correlate measured impedance differences to actual physical dimensional differences.

Figure 2:
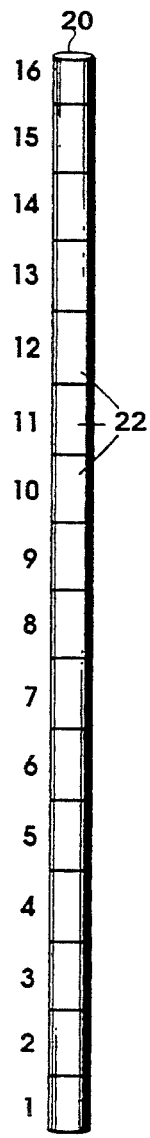
FIG. 2 is a diagrammatic representation of an exemplary embodiment of a calibration standard cladding tube in accordance with the present invention.

In an exemplary embodiment of the invention, primary calibration standard cladding tube 20 consists of sixteen distinct segments 22 as shown in FIG. 2. These segments are joined together to form a single long calibration standard tube. Each segment has approximately the same length as the dummy load reference segment (e.g., two inches) and is preferably not much larger than the length of coils 12 and 14. In addition, each segment 22 has the same liner thickness but different outside and inside diameters which are known to a high precision. Table 1 below lists the sixteen different segment numbers of the primary calibration standard along with exemplary outside ($OD_i$) and inside ($ID_j$) diameters for each segment.

TABLE 1

| SEGMENT NO. | OD | ID |
|---|---|---|
| 1 | .4425 | .3790 |
| 2 | .4400 | .3790 |
| 3 | .4375 | .3790 |
| 4 | .4350 | .3790 |
| 5 | .4425 | .3815 |
| 6 | .4400 | .3815 |
| 7 | .4375 | .3815 |
| 8 | .4350 | .3815 |
| 9 | .4425 | .3840 |
| 10 | .4400 | .3840 |
| 11 | .4375 | .3840 |
| 12 | .4350 | .3840 |
| 13 | .4425 | .3865 |
| 14 | .4400 | .3865 |
| 15 | .4375 | .3865 |
| 16 | .4350 | .3865 |

Table 2 below illustrates exemplary preferred inside and outside diameter combinations for each numbered segment of the primary calibration standard in the form of a dimensional matrix.

Table 2 below illustrates exemplary preferred inside and outside diameter combinations for each numbered segment of the primary calibration standard in the form of a dimensional matrix.

TABLE 2

| 1) $OD_1/ID_1$ | 2) $OD_2/ID_1$ | 3) $OD_3/ID_1$ | 4) $OD_4/ID_1$ |
|---|---|---|---|
| 5) $OD_1/ID_2$ | 6) $OD_2/ID_2$ | 7) $OD_3/ID_2$ | 8) $OD_4/ID_2$ |
| 9) $OD_1/ID_3$ | 10) $OD_2/ID_3$ | 11) $OD_3/ID_3$ | 12) $OD_4/ID_3$ |
| 13) $OD_1/ID_4$ | 14) $OD_2/ID_4$ | 15) $OD_3/ID_4$ | 16) $OD_4/ID_4$ | where,
OD = outside diameter,
ID = inside diameter,
$OD_1 > OD_2 > OD_3 > OD_4$, and
$ID_1 < ID_2 < ID_3 < ID_4$ Upon passing the primary calibration standard through the eddy-current probe coil, dimensional differences between the segments in the calibration standard and the dummy load reference tube segment will cause a unique measurable impedance imbalance for each of the sixteen segments. These impedance difference measurements are correlatable to the known dimensions of the primary calibration standard segments. Mathematically speaking, since electrical impedance consists both of real and imaginary components, namely the inductive reactance and the resistance, it may be represented diagrammatically by a point plotted in the real/imaginary complex plane. Consequently, a conventional eddy-current impedance measurement instrument having a cathode ray tube (CRT) display arrangement, which is configured to depict impedance values using horizontal and vertical axes of the display to represent the complex impedance plane, may be used to display the unique impedances of each of the sixteen segments of the calibration standard.

Figure 3:
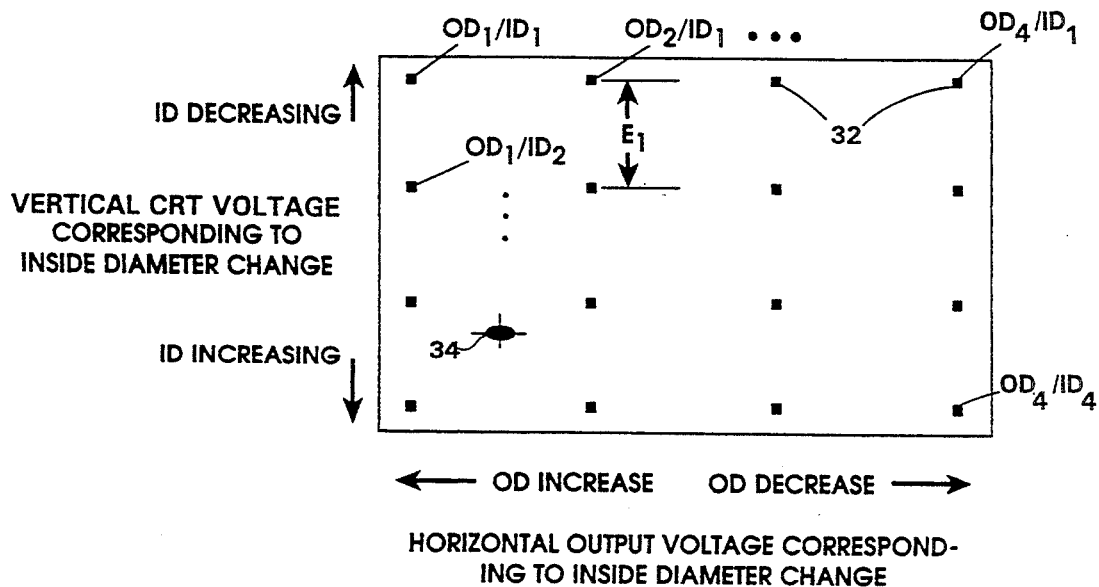
FIG. 3 is an representation of a CRT display of exemplary impedance values in the complex plane for a calibration standard and a specimen measurement.

A CRT display of measured impedances for all of the segments of calibration standard 20 in this manner forms an "impedance matrix", as illustrated in FIG. 3. The different impedance values for the segments appear as illuminated spots on the CRT display screen (represented in FIG. 3 by rectangular spots 32). For example, each displayed impedance corresponds to a particular inside and outside diameter combination listed in TABLE 2. Since the inside and outside diameter dimensions of a tube affect its measured impedance, a CRT display in the impedance plane of a particular cladding tube under test can be utilized to determine the inside and outside diameter of the tube by comparison (either visually or electronically) of its measured impedance with the previously measured impedances of the calibration standard.

More specifically, the cathode ray tube display in a convention eddy-current instrument can be configured to display measured input voltages that are calibrated with respect to indicia on the face of the display in either or both of the horizontal and vertical directions. Consequently, the display of an impedance matrix can be oriented (e.g., rotated) so that horizontal axis voltage indicia correspond to differences in tube outside diameter and vertical axis voltage indicia correspond to differences in tube inside diameter or vice versa. In accordance with a preferred embodiment of the present invention, the unit difference in vertical positions of each displayed impedance spot 32 is calibrated to the unit difference in inside diameters between segments of the calibration standard. For example, referring again to FIG. 3, $E_1$ represents a difference in CRT vertical display voltage produced by a difference in the measured impedances of two separate primary calibration standard segments. The impedance matrix, however, is purposely oriented on the display such that $E_1$ also directly corresponds solely to a difference in inside diameters of the calibration segments.

During the testing of cladding tubes, when a specimen tube is inserted into the circumferential measuring coil, the resulting detected impedance measurement will fall somewhere within the range of impedance values forming the calibration standard impedance matrix. Referring again to FIG. 3, circular mark 34 represents the impedance value of an exemplary specimen cladding tube measured at some arbitrary point along its length. Since each of the displayed impedance values, 32, making up the primary calibration standard impedance matrix are correlated to known outside and inside tube diameters of segments in the primary calibration standard, the outside and inside diameter of a specimen cladding tube can be uniquely determined for any desired point along its length from its impedance relative to the known calibration standard impedance values. However, this approach to determining diameter dimensional information is only accurate to the extent that the specimen cladding tube liner thickness is identical to the liner thickness of the calibration segments in the primary calibration standard.

For example, due to relative differences in electrical resistivity of the Zircaloy-2 tube metal and the pure zirconium liner (72 micro-ohm-centimeters vs. 40 micro-ohm-centimeters, respectively) the overall measured conductance of induced eddy-current (and hence the impedance) is dependant on the relative proportions of Zircaloy-2 and zirconium in the cladding tube. Accordingly, if the cladding liner thickness is less than that of the calibration standard segments, the overall conductance (and correspondingly the overall impedance)

will be less than that of the calibration standard and, therefore, will produce an erroneous measurement indicating an inside diameter greater than the actual inside diameter of the cladding tube. Conversely, a cladding tube liner thickness greater than that used in the calibration standard segments will cause an erroneous measurement indicating an inside diameter less than the actual value. However, in accordance with the present invention, if liner thickness can be separately calibrated to measured impedances and the "actual" cladding tube inside diameter determined precisely via ultrasonic (or other) techniques, then the difference between the actual inside diameter and the inside diameter as determined electromagnetically can be used to deduce the thickness of a cladding tube liner.

Figure 4:
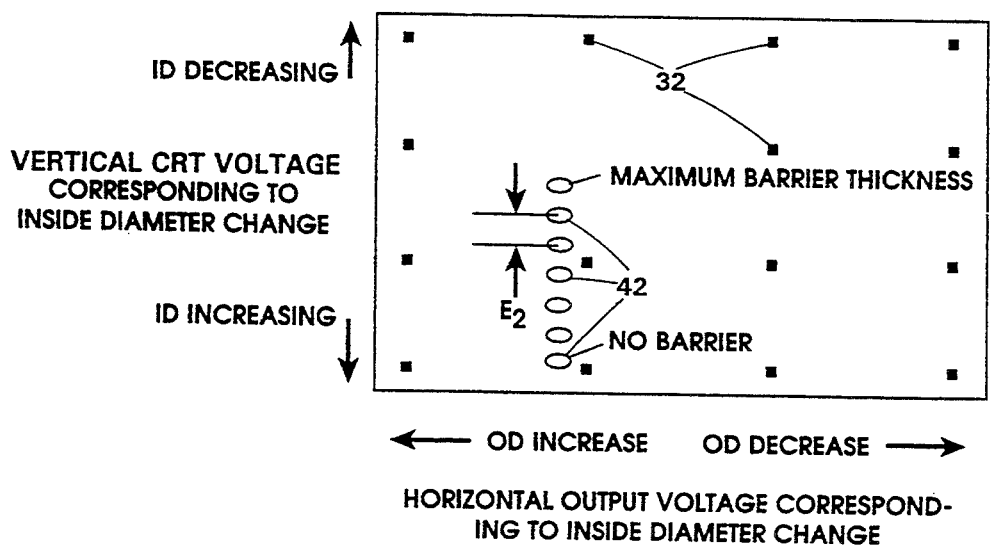
FIG. 4 is an representation of a CRT display of exemplary impedance values for two different calibration standards.

Thus, in accordance with a preferred embodiment of the present invention, a second calibration standard cladding tube (not shown) is used to calibrate the effect that various liner thicknesses have on the overall measured impedance. Accordingly, the second calibration standard consists of multiple tube segments (e.g., seven in the presently preferred embodiment) having various known liner thicknesses but all having the same inside and outside tube diameters. FIG. 4 shows a representation of a CRT display of exemplary measured impedances (spots 32 and 42) for the two different calibration standards. The second calibration standard produces a vertical array of spots 42 on the CRT display distinct from spots 32 comprising the impedance matrix of the primary calibration standard. Spots 42, represented in FIG. 4 by seven small circles, indicate the separate measured impedances for each of the known different liner thicknesses of the seven segments of the second calibration standard. Since a separation in the displayed impedances of the second calibration standard correlates to liner thickness only, the unit difference in vertical positions of each displayed impedance spot 42 is, thus, calibrated to the unit difference in liner thicknesses. For example, referring again to FIG. 4, $E_2$ represents a difference in CRT vertical display voltage produced by a difference in the measured impedances of two separate segments of the second calibration standard. The measured impedances of the second calibration standard, however, are oriented on the display such that $E_2$ also corresponds to a difference in liner thicknesses of the calibration segments.

In accordance with a method of the present invention, the actual liner thickness, $T_b$, for a particular fuel rod cladding tube undergoing test, can be calculated using the known thickness of the liner in the sixteen segments of the first calibration standard, the difference between ultrasonic and electromagnetic measured values for inside diameter, and the impedance values (represented as voltages) from the two calibration standards, by using the following formula:

$$T_b = T_{std} + E_1/E_2 \times (ID_{ut} - ID_{ec}) \qquad \text{(Equ. 1)}$$

where, $T_b$ = Liner (or "barrier") thickness $T_{std}$ = Thickness of liner in the segments of the primary calibration standard $E_1$ = Change in vertical display voltage per unit change in inside diameter as measured by electromagnetic subsystem $E_2$ = Change in vertical display voltage per unit change in liner thickness as measured by electromagnetic subsystem $ID_{ut}$ = Inside diameter determined ultrasonically, and $ID_{ec}$ = Inside diameter determined by electromagnetic subsystem.

Figure 5:
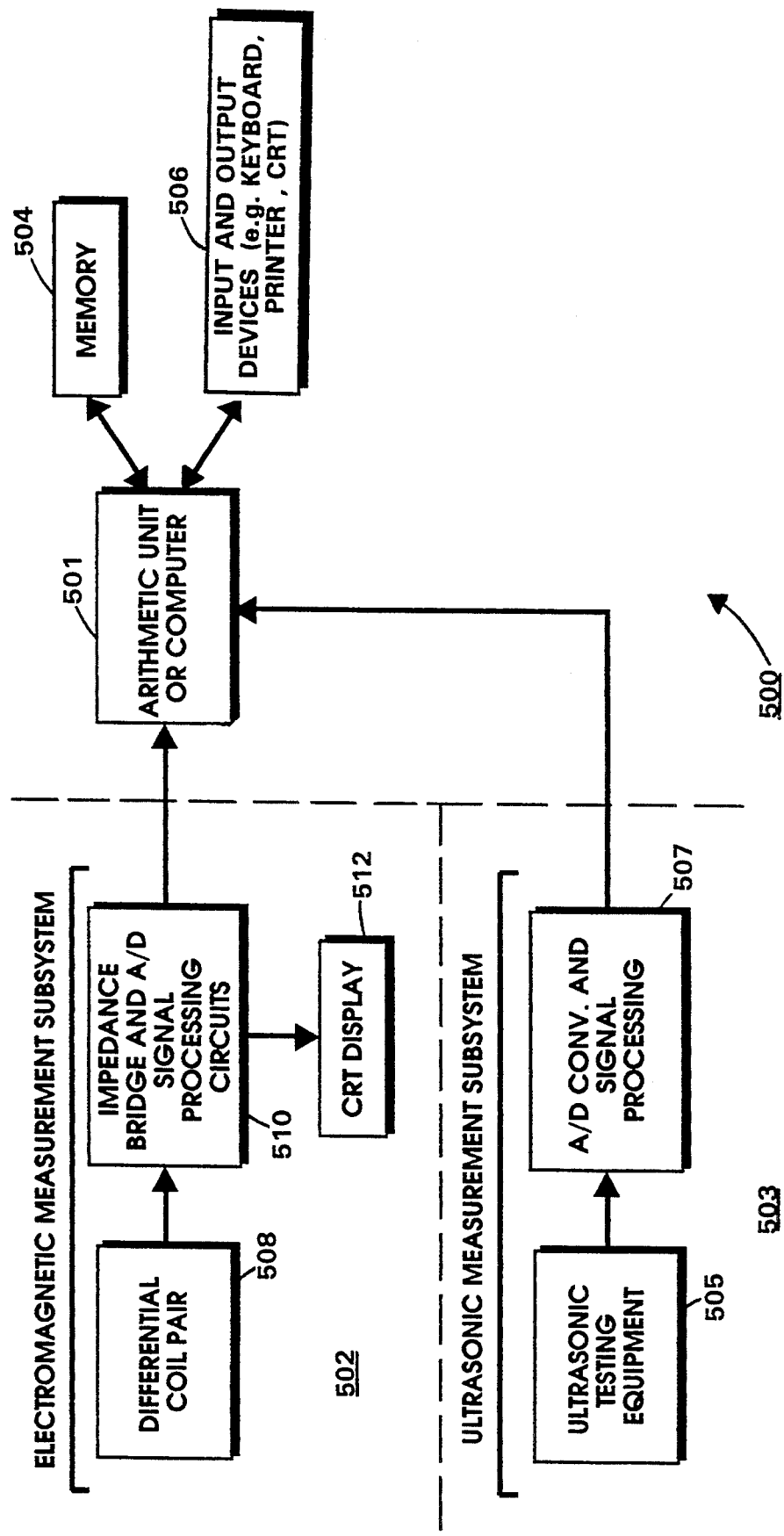
FIG. 5 is a block diagram of the combined electromagnetic and ultrasonic nondestructive testing system in accordance with a preferred embodiment of the present invention.

Referring now to FIG. 5, a block diagram illustrates the combined eddy-current and ultrasonic testing system in accordance with an exemplary embodiment of the present invention. Arithmetic unit (or computer) 501, obtains measurement information separately from both ultrasonic subsystem 503 and electromagnetic subsystem 502. Electromagnetic measuring subsystem 502 includes differential coil pair eddy-current impedance probe arrangement 508 (depicted in FIG. 1) connected to a data acquisition system (DAS) consisting of a conventional electrical impedance measurement bridge with associated signal processing and A/D (analog-to-digital) conversion circuits 510. A display device, for example, CRT 512, may also be connected to the DAS.

DAS electromagnetic signal processing circuitry 510 may also include a computer or microprocessor programmed for performing conventional signal analysis and measurement interpolation calculations. For example, inputs to DAS 500 are interpolated from the correlation of "horizontal" voltage to outside diameter and "vertical" voltage to inside diameter using conventional LaGrainge interpolation calculations by using DAS processing circuitry 510. Alternatively, this correlation may be performed from digitized measurement data by computer 501.

Ultrasonic subsystem 503 basically consists of conventional ultrasonic testing equipment 505 connected either directly or indirectly, through conventional a/d conversion and signal processing circuits 507, to computer 501. Ultrasonic testing equipment 505 may be any conventional system or apparatus for accurately measuring the wall thickness of a metal tube through ultrasonic techniques, such as, for example, the apparatus disclosed in commonly assigned U.S. Pat. No. 5,063,780, issued Nov. 12, 1991 to Landry. Digitized impedance data acquired from electromagnetic subsystem 503 and digitized diameter measurement data from ultrasonic measurement subsystem 502 is stored in memory 504 and subsequently retrieved by computer 501 to calculate thickness, $T_b$, of a cladding tube liner in accordance with Equ 1 above. Computed liner thickness data may then be stored in memory 504 or printed or displayed via output devices 506.

Figure 6:
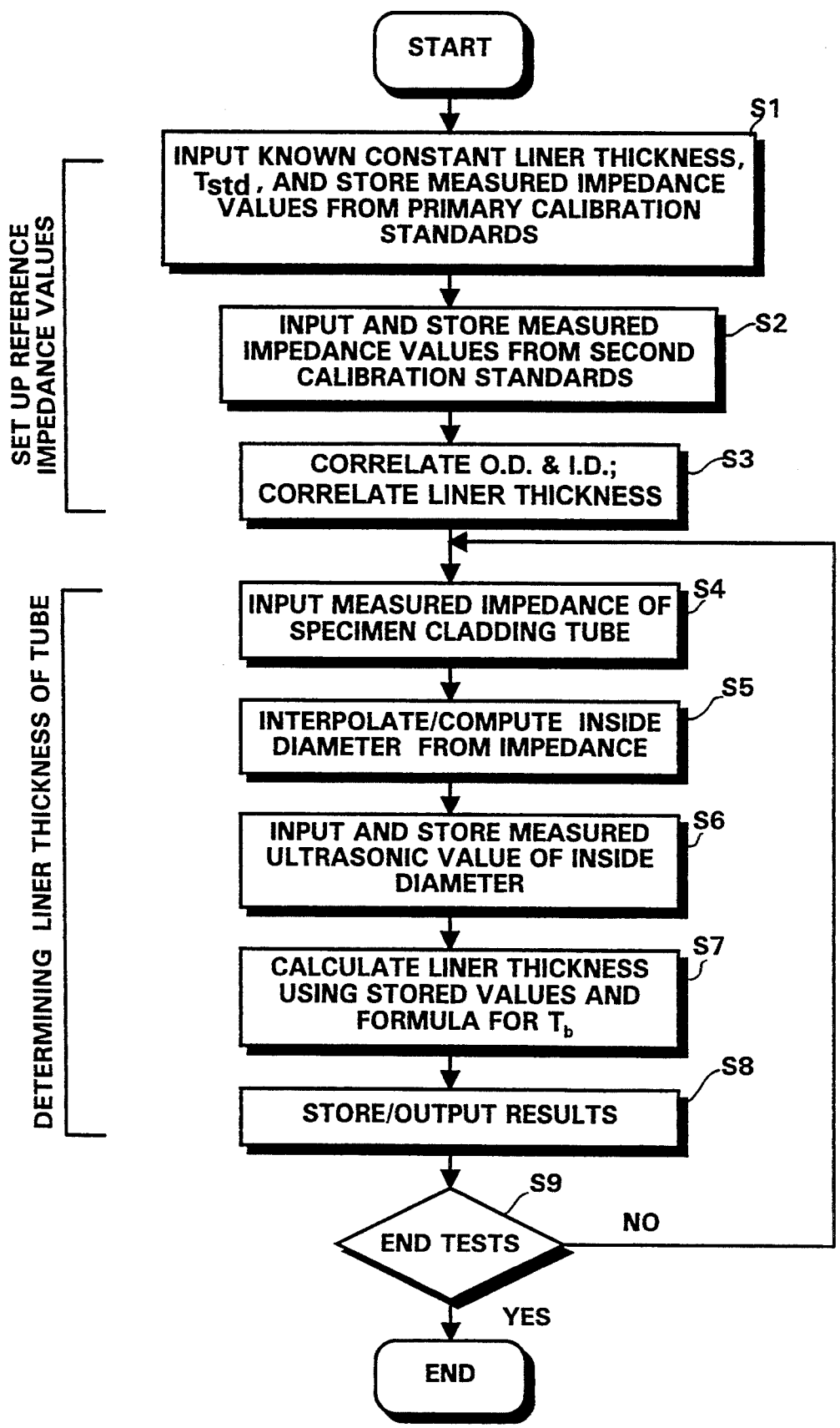
FIG. 6 is a flowchart showing exemplary steps for an arithmetic unit or computer controller in determining the liner thickness of a cladding tube.

Referring now to FIG. 6, a schematic flowchart is shown that illustrates steps of an exemplary program executed by an arithmetic unit or computer 501 for acquiring measurement data and calculating liner thickness in accordance with a preferred embodiment of the invention. Steps S1 and S2 of the flowchart provide for the setting up of reference impedance values in memory 504 from the two calibration standards for subsequent use in computing Equ 1. Steps S3 through S8 provide for determining liner thickness from both impedance and ultrasonic data acquired from the specimen under test. More specifically, in Step 1, a known value of liner thickness, $T_{std}$, for the primary calibration standard is input via conventional input device 506 and stored in memory 504. In addition, impedance values from primary calibration standard 20 are obtained from electromagnetic measurement subsystem 502 and also stored in memory 504. In step S2, impedance values from the second calibration standard are, likewise, measured and stored. (step S2 may be performed prior to step S1 or as part of the same step). In step S3, the input data from the eddy-current subsystem (502) is correlated (for example, by performing LaGrainge interpolations) to the measured values of outer diameter and inner diameter from the primary standard and the known liner thicknesses from the secondary standard.

Next in step S4, a specimen is tested electromagnetically using subsystem 508 and the measured impedance is stored in memory 504. If desired, impedances of the calibration standards and the test specimen may also be displayed as measured during these steps via CRT 512. In step S5, conventional eddy-current analysis and computational techniques are performed to interpolate/calculate an inside diameter value for the tested specimen based on its measured impedance and the stored reference impedance values of the primary calibration standards. This value, $ID_{ec}$, is then stored in memory 504. Next, in step S6, the inside diameter of the same specimen is tested ultrasonically using subsystem 503 and the resulting diameter data, $ID_{ut}$, is also stored in memory 504. (Step S5 may be performed prior to step S3 instead, if desired). In step S7, the liner thickness, $T_b$, is calculated according to Equ 1 from the stored impedance and ultrasonic data. This information is then stored in memory 504 and/or provided to a printer or other output devices 506, as indicated in step S8. Finally, in step S9, measuring of other cladding tube specimens to determine liner thickness is conducted in the same manner or else the testing process is terminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. A person of ordinary skill in the art should appreciate that the requisite correlated reference impedance values could be obtained by utilizing a single "combined" calibration standard having the calibrated segments of both the primary and second calibration standard tubes instead of using two separate calibration tubes. Moreover, a person of ordinary skill in the art should realize that various utilizations of the invention may not require the use of all sixteen impedance references of the primary standard or all seven impedance references of the second calibration standard and that the calibration of reference impedance values would not necessarily have to correspond to any particular CRT display axis or orientation. In addition, although the presently preferred embodiment utilizes ultrasonic techniques for acquiring the inside diameter of a specimen, it is envisioned that other systems or means for acquiring "actual" inside diameter information could also be used without departing from the scope of the invention.

What is claimed is:

1. A system for determining the thickness of a metallic liner or coating provided at an inner surface of a metal tube, comprising:
   an electromagnetic eddy-current inducing impedance measurement subsystem, having a non-invasive eddy-current inducing probe, for externally determining an inside diameter of said tube;
   an ultrasonic dimensional measurement subsystem for determining an inside diameter of said tube;
   a memory for storing measurement data provided by said electromagnetic and ultrasonic subsystems; and
   an arithmetic processing unit, connected to said ultrasonic and electromagnetic subsystems and to said memory, for calculating the thickness of said liner, said calculations based on said measurement data of said tube inside diameter acquired from both of said measurement subsystems.

2. A system as set forth in claim 1 wherein said electromagnetic impedance measurement subsystem includes a differential coil eddy-current probe arrangement comprising an eddy-current-inducing impedance measurement coil for measuring an impedance from outside of a specimen metal tube by passing said specimen tube through the center of an eddy-current-inducing impedance measurement coil to a point along the length of said tube where said liner thickness is to be determined.

3. A system as set forth in claim 1 wherein said arithmetic processing unit is connected to a printer.

4. A system as set forth in claim 1 wherein said arithmetic processing unit is integral to said electromagnetic impedance measurement subsystem.

5. In a combined ultrasonic and eddy-current nondestructive testing arrangement having a memory for storing measurement and reference data and an arithmetic processor for performing calculations on said data, a method for determining thickness of metallic linings and metallic coatings provided at an inside surface of a metal tube, comprising the steps of:
   a) measuring, using an electromagnetic eddy-current-inducing impedance measuring arrangement, and storing as a set of calibration reference values in said memory, a plurality of impedances corresponding to lined tubes of predetermined combinations of known inside diameters, outside diameters and lining thicknesses, including a first subset of reference values consisting of impedances measured from lined tubes having the same lining thickness but different inside and outside diameter dimensions, and further including a second subset of reference values consisting of impedances measured from lined tubes having the same inside and outside diameters but different lining thicknesses;
   b) storing in said memory a predetermined reference value for the thickness of a lining corresponding to said first subset of reference values;
   c) measuring an impedance of a tube specimen under test, using said electromagnetic measuring arrangement, and storing said value in said memory;
   d) determining a first inside diameter value of said specimen tube using conventional eddy-current analysis computational techniques and storing said first inside diameter value in said memory;
   e) analyzing said specimen tube and determining a second inside diameter value of said specimen tube by conventional ultrasonic diagnostic techniques and storing said second inside diameter value in said memory; and
   f) calculating a value for a thickness of said specimen tube lining based on said stored calibration reference values for impedances, said reference value for lining thickness, said measured impedance of said specimen tube and the difference between said first and second inside diameter values.

6. The method as set forth in claim 5, wherein said step of calculating a value for a thickness of said specimen tube lining further includes steps of:
   correlating differences in tube inside diameters for tubes with identical lining thicknesses to changes in impedance from said calibration reference values; and correlating differences in tube lining thickness for tubes with identical inner and outer diameter dimensions to changes in impedance, as measured by said electromagnetic measuring arrangement, from said calibration reference values.

7. A method as set forth claim 5, wherein said electromagnetic impedance measuring arrangement includes a differential coil eddy-current probe arrangement comprising a non-invasive eddy-current-inducing impedance measurement coil for measuring an impedance from outside of said metal tube, and said step of measuring an impedance of a tube specimen under test, includes:

passing said specimen tube through the center of an eddy-current-inducing impedance measurement coil to a point along the length of said tube where said liner thickness is to be determined and obtaining an external impedance measurement thereat.

8. A method for determining thickness of metallic linings or coatings provided at an inside surface of a metal tube, using a set of calibration reference values comprising a plurality of impedance values corresponding to impedances, measured via an electromagnetic eddy-current-inducing measuring arrangement, of lined tubes of predetermined combinations of known inside diameters, outside diameters and lining thicknesses, including a first subset of reference values consisting of calibration impedances measured from lined tubes having the same lining thickness but different inside and outside diameter dimensions, and including a second subset of reference values consisting of calibration impedances measured from lined tubes having the same inside and outside diameters but different lining thicknesses, and further including a predetermined reference value for the thickness of a lining corresponding to said first subset of reference values, comprising the steps of:

a) measuring an impedance of a tube specimen under test using an electromagnetic eddy-current-inducing measuring arrangement;
b) determining a first inside diameter value of said specimen tube using conventional eddy-current analysis computational techniques;
c) analyzing said specimen tube by conventional ultrasonic diagnostic techniques and determining a second inside diameter value of said specimen tube; and
d) calculating a value for a thickness of said specimen tube lining based on said calibration reference values, said reference value for lining thickness, said measured impedance of said specimen tube, and the difference between said first and second inside diameter values.

9. The method as set forth in claim 8, wherein said value for lining thickness is calculated according to the following formula:

$$T_b = T_{std} + E_1/E_2 \times (ID_{ut} - ID_{ec})$$

where, $T_b$ = calculated value of lining thickness;
$T_{std}$ = reference value for lining thickness;
$E_1$ = a calibration reference value that correlates differences in tube inside diameter to changes in impedance as measured by the electromagnetic measuring arrangement;
$E_2$ = a calibration reference value that correlates differences in tube lining thickness to changes in impedance as measured by the electromagnetic measuring arrangement;
$ID_{ut}$ = Inside diameter determined ultrasonically; and
$ID_{ec}$ = Inside diameter determined by electromagnetically.

10. The method as set forth in claim 8, wherein said step of calculating a value for a thickness of said specimen tube lining further includes steps of:

correlating differences in tube inside diameters for tubes with identical lining thicknesses to changes in impedance from said calibration reference values; and correlating differences in tube lining thickness for tubes with identical inner and outer diameter dimensions to changes in impedance, as measured by said electromagnetic measuring arrangement, from said calibration reference values.

11. A method as set forth claim 8, wherein said electromagnetic impedance measuring arrangement includes a differential coil eddy-current probe arrangement comprising a non-invasive eddy-current-inducing impedance measurement coil for measuring an impedance from outside of said metal tube, and said step of measuring an impedance of a tube specimen under test, includes:

passing said specimen tube through the center of an eddy-current-inducing impedance measurement coil to a point along the length of said tube where said liner thickness is to be determined and obtaining an impedance measurement thereat.

12. An apparatus for determining the thickness of a metallic liner provided at an inner surface of a metal alloy tube, comprising:

a non-invasive eddy-current-inducing diagnostic means for determining an inside diameter of said tube, said eddy-current-inducing means operative to determine said inside diameter from outside of said tube;

a non-eddy-current-inducing diagnostic means for determining an inside diameter of said tube; and an electronic digital computer, connected to said eddy-current-inducing diagnostic means and to said non-eddy-current-inducing diagnostic means, for calculating a thickness of said liner based on reference data stored in said computer and measurement data of said tube inside diameter acquired by said computer from both of said diagnostic means.

13. A apparatus as set forth in claim 12, wherein said eddy-current-inducing diagnostic means includes a differential coil eddy-current probe arrangement comprising an eddy-current-inducing impedance measurement coil for measuring an impedance from outside of said tube by passing a specimen tube through the center of an eddy-current-inducing impedance measurement coil to a point along the length of said tube where said liner thickness is to be determined.

14. An apparatus as set forth in claim 12, wherein a liner thickness, $T_b$, is calculated by said digital computer according to the following formula:

$$T_b = T_{std} + E_1/E_2 \times (ID_{nec} - ID_{ec})$$

where, $T_b$ = calculated value of liner thickness;
$T_{std}$ = a calibration reference data value for a standard liner thickness;

$E_1$ = a calibration reference data value that correlates differences in tube inside diameter to changes in impedance as measured by said eddy-current-inducing diagnostic means;

$E_2$ = a calibration reference data value that correlates differences in tube lining thickness to changes in impedance as measured by said eddy-current-inducing diagnostic means;

$ID_{nec}$ = Inside diameter determined by non-eddy-current-inducing diagnostic means; and $ID_{ec}$ = Inside diameter determined by eddy-current-inducing diagnostic means.

15. A system as set forth in claim 2 wherein said differential coil eddy-current probe arrangement further comprises a load balancing reference coil.

16. An apparatus as set forth in claim 13, wherein said differential coil eddy-current probe arrangement further comprises a load balancing reference coil, said reference coil surrounding a reference metal tube section.

* * * * *